United States Patent [19]

Backderf et al.

[11] Patent Number: 4,927,886
[45] Date of Patent: May 22, 1990

[54] LOW INHERENT VISCOSITY-HIGH GLASS TRANSITION TEMPERATURE ENHANCING AGENTS PRODUCED BY MASS REACTION POLYMERIZATION AS AN OVERPOLYMER ON POLYVINYL CHLORIDE RESINS

[75] Inventors: Richard H. Backderf, Richfield; Frank J. Donat, Mantua, both of Ohio

[73] Assignee: The B. F. Goodrich Company, Akron, Ohio

[21] Appl. No.: 85,668

[22] Filed: Aug. 14, 1987

[51] Int. Cl.$^5$ .......................... C08F 8/34; C08F 14/06
[52] U.S. Cl. .................................. 525/261; 428/515; 525/73; 525/203; 525/244; 525/272; 525/279; 525/285; 525/289; 525/317
[58] Field of Search ............... 525/261, 317, 279, 285, 525/289, 272, 244

[56] References Cited

U.S. PATENT DOCUMENTS

| | | | |
|---|---|---|---|
| 3,644,577 | 2/1972 | Lee et al. | 525/317 |
| 4,448,580 | 5/1984 | Abe et al. | 525/261 |
| 4,814,387 | 3/1989 | Donat | 525/261 |

*Primary Examiner*—Jacob Ziegler
*Attorney, Agent, or Firm*—Daniel J. Hudak; Joe A. Powell

[57] ABSTRACT

Polyvinyl chloride resins are treated with a low inherent viscosity-high glass transition temperature enhancing agent to impart improved processing properties thereto, especially melt flow, which are desirable in various melt type fabrication processes such as custom injection molding. The high glass transition temperature-inherent viscosity enhancing agent is made by polymerizing one or more high glass transition temperature agent forming monomers in the presence of a chain transfer agent. The agent has a high glass transition temperature as well as a low inherent viscosity. The high glass transition temperature-inherent viscosity enhancing agent is produced as an overpolymer in a mass polymerization reaction.

8 Claims, No Drawings

LOW INHERENT VISCOSITY-HIGH GLASS TRANSITION TEMPERATURE ENHANCING AGENTS PRODUCED BY MASS REACTION POLYMERIZATION AS AN OVERPOLYMER ON POLYVINYL CHLORIDE RESINS

FIELD OF THE INVENTION

The present invention relates to mass overpolymerization of high glass transition temperature-inherent viscosity enhancing agents on polyvinyl chloride resin with the treated resin being particularly suitable for various melt type fabrication processes and applications.

BACKGROUND

Heretofore, certain types of polymers or copolymers were blended with polyvinyl chloride (PVC) resins to increase the glass transition temperature thereof. Such blends containing the glass transition temperature improving polymers or copolymers generally were unsatisfactory for various melt type fabrication processes such as custom injection molding (CIM) applications. When glass transition temperature improving polymers or copolymers having a low inherent viscosity in and of themselves were blended with PVC resins, the powder flux in various processing devices such as an extruder, a Bandbury, a mill, or an injection molding machine, was often unsatisfactory. Hence, high glass transition temperature polymers or copolymers were utilized having high inherent viscosities. Such high inherent viscosities decreased the melt flow when blended with PVC and limited the usefulness thereof in melt type fabrication processes.

SUMMARY OF THE INVENTION

It is therefore an aspect of the present invention to provide a treated polyvinyl chloride resin suitable for melt type processes and applications. It is also desirable to provide a low inherent viscosity-high glass transition temperature agent treated polyvinyl chloride resin which is easily processed, has excellent melt flow properties with regard to melt type processes, and has excellent dispersion of the glass transition treating agent therein. The treated PVO resin is made by a mass reaction of chain transfer agents and high glass transition temperature agent forming monomers along with a free radical initiator applied to the resin as through overpolymerization thereon whereby some grafting to the resin occurs.

The invention will be better understood by reference to the following detailed description.

DETAILED DESCRIPTION

The polyvinyl chloride resin of the present invention is generally in particulate form and is made according to any conventional method or manner as well as those known to the art and to the literature such as mass polymerization, suspension polymerization, dispersion polymerization, emulsion polymerization, and the like. Although copolymers can be utilized, it is highly preferred that the polyvinyl chloride resin be a homopolymer. When a copolymer, the comonomer can be any such monomer known to the art and to the literature such as various vinyl halides and vinylidene halides, for example vinyl bromide, vinylidene chloride, and the like, esters of acrylic acid, vinyl acetate, esters of methacrylic acid, and the like. It is also to be understood that by the term "polyvinyl chloride" is included chlorinated polyvinyl chloride resins containing a total of from about 57% to about 72% by weight of chlorine therein.

The polyvinyl chloride particulate resins of the present invention and especially the preferred homopolymer are generally treated with the high glass transition temperature-inherent viscosity enhancing treating agent before the application thereto of any compounding aids, processing aids, conventional additives, and the like. The amount of polyvinyl chloride polymers is based upon 100 parts by weight of the high glass transition temperature agent forming monomers and is from about 50 parts to about 2,000 parts, desirably from about 75 to about 500 parts, preferably about 100 to about 350 parts, and more preferably from about 125 to about 300 parts by weight. Stated in terms of overpolymerization, that is the amount of the high glass transition temperature agent forming monomers based upon the same monomers, the chain transfer agent and the polyvinyl chloride resin, the amount is from about 5% to about 70%, and preferably from about 25% to about 45% by weight. Such amounts of the high glass transition temperature agent forming monomers generally result in increasing the glass transition temperature by at least 5° C., desirably at least 12° C., and preferably at least 20° C.

The high glass transition temperature polyvinyl chloride treating agents of the present invention which are made from various monomers are generally known to the art and to the literature. Generally, any conventional polyvinyl chloride glass transition temperature enhancing agent, for example a polymer or a copolymer, can be utilized to increase the glass transition temperature of the polyvinyl chloride resin. Examples of specific compounds are polymers or copolymers containing conventional amounts of the various components and are made from one or more styrene type monomers such as styrene, alpha-methylstyrene, para-methylstyrene, vinyl nitriles such as acrylonitrile and methacrylonitrile, methacrylates such as methylmethacrylate, the various maleimides, the various indenes, the various norbornenes including norbornadiene, the various unsaturated acid anhydrides such as maleic anhydride, and combinations thereof. Preferred glass transition temperature enhancing agents of the present invention include styrene, alpha-methylstyrene, acrylonitrile, with a copolymer of acrylonitrile and alpha-methylstyrene being highly preferred.

It is an important aspect of the present invention that chain transfer agents be utilized during the polymerization of the high glass transition temperature agent forming monomers, that is monomers which when polymerized form the high glass transition temperature enhancing agents of the present invention. The utilization of chain transfer agents has been found to impart low melt viscosity, that is to reduce the inherent viscosity of the glass transition temperature enhancing agents, apparently by shortening the chain length thereof, and hence also reduces the overall inherent viscosity of the mass overpolymerized treated polyvinyl chloride particulate resin.

According to the concepts of the present invention, polymerization preferably occurs via a mass reaction, that is without water, a suspension medium, emulsifiers, etc. Water, as in suspension polymerization, is avoided since the type of chain transfer agent which can be utilized is somewhat limited and difficulties may be encountered removing the chain transfer agent from the polyvinyl chloride resin. The overpolymerization reaction involves a mixture of the chain transfer agents with the glass transition temperature agent forming monomers which are applied to the polyvinyl chloride particulate resin in the presence of free radical initiators with the polymerization reaction being carried out thereon in an inert atmosphere such as nitrogen. It is noted that the overpolymerization reaction often involves grafting of a minor amount of the reactant compounds on the polyvinyl chloride resin. Inasmuch as the polyvinyl chloride particles are somewhat porous, polymerization not only occurs on the surface thereof, but also within the pores, the voids, the cracks, the fissures, etc., thereof. Hence, the reaction is not solely a surface phenomenon since it actually penetrates, permeates, or is absorbed and thus the reaction also occurs within the polyvinyl chloride particle. The porous nature of the polyvinyl chloride resin also results in good dispersion of the formed low inherent viscosity-high glass transition temperature enhancing agent.

The chain transfer agents generally include any organic compound which contains an active hydrogen or an active halogen. A suitable class of such a compound are the various mercaptan compounds, generally known to the art as well as to the literature. Such mercaptan compounds are generally alkyl mercaptans having from 1 to 22 carbon atoms with from 5 to 18 carbon atoms being preferred. Examples of mercaptan chain transfer agents include t-octyl mercaptan, decyl mercaptan, t-dodecyl mercaptan, and the like. It is noted that water soluble mercaptans can also be utilized in the present invention even though the reaction with the glass transition temperature agent forming monomers are carried out in a mass reaction, that is without water. Such water soluble chain transfer agents are generally ineffective when utilized in a suspension polymerization. Another class or group of chain transfer agents which can be utilized are the various mercaptan alcohols such as those having from 2 to about 22 carbon atoms with from 2 to 12 carbon atoms being preferred. Specific examples include 2-mercaptoethanol, 8-mercapto-1,2-propanediol, and 3-mercaptopropionic acid, and the like. Another class of chain transfer agents are the alkenes or benzoalkenes (that is aromatic alkenes) containing at least one allylic hydrogen atom and having a total of from 3 to 20 carbon atoms and preferably from 3 to 12 carbon atoms such as propene, 1-butene, 2-butene, and the like. Various chlorinated or brominated alkanes, alkenes, or alkynes having from 1 to 12 carbon atoms can also be utilized such as chloroform, trichloroethylene, bromoform, and the like. Aldehydes having from 1 to 15 carbon atoms can also be utilized such as formaldehyde, and acetaldehyde. Another chain transfer agent which can be utilized quite effectively is $H_2S$ gas. Generally, $H_2S$, and the alkyl mercaptans are desired with the various mercaptan alcohols being preferred. An especially preferred compound is 2-mercaptoethanol.

The amount of chain transfer agent utilized in the mass reaction is usually quite small and is an effective amount to reduce the inherent viscosity of the formed overpolymer on the polyvinyl chloride resin. That is, the addition of the high glass transition temperature agent, by itself, tends to increase the inherent viscosity of the overall, that is the overpolymerized, polyvinyl chloride resin system. Hence, the overall inherent viscosity of the polyvinyl chloride resin and the reacted low inherent viscosity-high glass transition temperature enhancing agent is reduced. The effective amount of the chain transfer agent utilized reduces the inherent viscosity of the overpolymerized polyvinyl chloride resin to at least the inherent viscosity of the polyvinyl chloride resin before the overpolymerization reaction with the high glass transition temperature agent. The inherent viscosity is desirably reduced to at least 5% and preferably reduced to at least 15% below the original inherent viscosity of the polyvinyl chloride resin before the overpolymerization reaction. With regard to custom injection molding (CIM) applications or processes, the inherent viscosity of the type of polyvinyl chloride resin utilized is such that the inherent viscosity of the overpolymerized polyvinyl chloride resin is generally below 0.70 down to about 0.25 and preferably from about 0.4 to about 0.6. The inherent viscosity of the overpolymerized polyvinyl chloride resin is measured at 25° C. utilizing 0.2 grams of the treated polyvinyl chloride resin in 50 ml of cyclohexanone solvent, in accordance with ASTM 358C. Generally, such an effective amount of the chain transfer agent is from about 0.3 to about 20 milliequivalents per 100 parts by weight of the glass transition temperature agent forming monomers, desirably from 1.0 to about 15 milliequivalents, and preferably from about 2 to about 10 milliequivalents.

The reaction of the high glass transition temperature agent forming monomers with an effective amount of the chain transfer agent is carried out in an oxygen-free environment as in an enclosed vessel, for example an autoclave having an agitator, mixer, etc. therein. Suitable types of such mixing reaction vessels include a ribbon blender, rotating autoclaves, a convention agitation suspension polymerization vessel, and the like. The method of preparation comprises adding polyvinyl chloride resin to the vessel and purging the air therefrom through the use of a vacuum and an inert gas, for example nitrogen, carbon dioxide, etc. Once the vessel has been purged, suitable and effective amounts of the high glass transition temperature agent forming monomers and the chain transfer agents are added thereto. Catalysts such as free radical catalysts are generally desired. The chain transfer agents, the glass transition temperature agent forming monomers, the free radical initiator, and the polyvinyl chloride resin are mixed in the reaction vessel with the glass transition temperature agent being polymerized at suitable times and temperatures. Since the monomer is added to the vessel and mixed the polyvinyl chloride resin, it coats as well as penetrates the porous resin. Overpolymerization is thus achieved. That is, the polymerization of the high glass transition temperature agent forming monomers occurs in situ on and in the polyvinyl chloride particles. Since desirably no water is utilized in the reaction, a mass polymerization occurs.

The catalysts are desirably oil soluble and water insoluble with high water insolubility being preferred. Two specific groups or classes of free radical initiators are the various azo type initiators as well as the various peroxide type initiators. Examples of specific azo type initiators include 2,2'-azobis(2,4-dimethyl-4-methoxyvaleronitrile), 2,2'-azobis(isobutyronitrile), and the like. Numerous peroxide initiators are known to the art and to the literature and various types thereof can be utilized such as diacyl peroxides, ketone peroxides, peroxydicarbonates, peroxyesters, dialkyl peroxides, hydroperoxides, peroxyketals, and the like. Examples of specific peroxides include decanoyl peroxide, lauroyl peroxide, benzoyl peroxide, alpha-cumylperoxy pivalate, t-butylperoxy neodecanoate, t-butylperoxy pivalate, ti-butylperoxyisobutylate, t-butylperoxy acetate, t-butylperoxy benzoate, dicumyl peroxide, di-t-butyl peroxide, t-butylhydroperoxide, 2,2-di(t-butylperoxy)-butane, and the like. The amount of the initiators is generally small as from about 0.05 parts to about 1.0 parts by weight and desirably from about 0.10 to about 0.75 parts by weight for every 100 parts by weight of the glass transition temperature agent forming monomers.

The time of the reaction as well as the temperature can naturally vary depending upon the amount of initiator utilized as well as the type of initiator. As a rule of thumb, polymerization of the high glass transition temperature agent forming monomers in the presence of chain transfer agents generally occurs at about 40° C. to about 90° C. with a temperature range of about 50° C. to about 85° C. being preferred.

The low inherent viscosity-high glass transition temperature treated polyvinyl chloride resins of the present invention have several advantages including a low product cost due to a low raw material and manufacturing cost, the ability to utilize existing mass polyvinyl chloride plant equipment, excellent melt flow characteristics for utilization in processing equipment such as injection molding equipment and other CIM applications, and the elimination of stripping residual vinyl chloride monomer from the resin before conducting the mass overpolymerization since the residual vinyl chloride monomer is reacted away during the overpolymerization reaction or process.

The treated polyvinyl chloride resins of the present invention can thus be utilized in various melt type fabrication processes such as extrusion, compression molding, blow molding, injection molding and the like. The present invention is particularly suitable for custom injection molding. Articles can thus be produced common to such processes such as bottles, TV housings, pipe fittings, battery jars, appliance housings, and the like.

The invention will be better understood by reference to the following examples.

EXAMPLE I

A quart beverage bottle was charged with the following formulation.

| FORMULATION I | | |
|---|---|---|
| | Pphm | |
| A suspension polyvinyl chloride | 278 | (IV = 0.54; Tg = 82° C.) |
| Alpha-methylstyrene | 69.1 | |
| Acrylonitrile | 30.9 | |
| Lauroyl Peroxide | 0.5 | |
| t-Butyl Peroctoate | 0.37 | |
| 2-mercaptoethanol | 0.25 | |
| 15 mm Steel Balls | 7 | |

The above ingredients with the exception of the steel balls and the polyvinyl chloride were premixed and added to the particulate polyvinyl chloride resin in a beverage bottle which was initially purged with nitrogen.

Upon completion of charging, the beverage bottle was tumbled for approximately 16 hours at 65° C. A tail reaction was then conducted for approximately 2 hours at 80° C.

The mass overpolymerized polyvinyl chloride resin was then tested with regard to inherent viscosity, glass transition temperature and conversion of the glass transition temperature agent forming monomers. The results are set forth in Table I. In a similar manner, a controlled reaction was utilized having the same formulation as set forth above except that no chain transfer agent was utilized. The results thereof are also set forth in Table I.

TABLE I

| | EX. I | Control |
|---|---|---|
| IV | 0.509 | 0.720 |
| Tg, °C. | 91.8 | 95 |
| Conversion, % | 92.7 | 90.9 |

As apparent from the above data, utilization of the chain transfer agents via a mass overpolymerization resulted in a dramatic reduction in the inherent viscosity. The conversation was slightly higher. Accordingly, the treated polyvinyl chloride resin of the present invention has a greatly improved melt flow rate.

EXAMPLE II

An exact manner as set forth in Example I, a glass transition temperature agent treated polyvinyl chloride resin was prepared except that $H_2S$ gas was utilized as a chain transfer agent. The amount of $H_2S$ utilized was 0.25 parts by weight per 100 parts by weight of the monomer. The only other formulation differences were that 0.18 parts by weight of lauroyl peroxide and 0.26 parts by weight of t-butyl peroctoate were utilized per i00 parts by weight of monomer. The following data were obtained.

TABLE II

| | EX. II | Control |
|---|---|---|
| Shell/core | 0.33 | 0.33 |
| IV | 0.479 | 0.720 |
| Tg, °C. | 92.9 | 93.0 |
| Conversion, % | 92.1 | 90.9 |

As apparent, once again a very reduced inherent viscosity was obtained.

While in accordance with the Patent Statutes, a best mode and preferred embodiment have been set forth, the scope of the invention is not limited thereto, but rather by the scope of the attached claims.

What is claimed is:

1. A low inherent viscosity-high glass transition temperature treated polyvinyl chloride resin comprising:
a polyvinyl chloride resin and a polyvinyl chloride high glass transition temperature-inherent viscosity enhancing agent, said glass transition temperature-inherent viscosity enhancing agent applied to said polyvinyl chloride resin by mass overpolymerization on and within said polyvinyl chloride resin being one or more high glass transition temperature agent forming monomers and an effective amount of one or more chain transfer agents so that the inherent viscosity of said treated polyvinyl chloride resin is reduced, said chain transfer agent being a mercaptan alcohol having from 2 to 22 carbon atoms, or $H_2S$ gas, the amount of said polyvinyl chloride resin being from about 50 parts to about 2,000 parts by weight for every 100 parts by weight of said one or more glass transition temperature agent forming monomers.

2. A low inherent viscosity-high glass transition temperature treated polyvinyl chloride resin according to claim 1, and wherein said effective amount of said one or more chain transfer agents is from about 0.3 milliequivalents to about 20 milliequivalents for every 100 parts by weight of said glass transition temperature agent forming monomers.

3. A low inherent viscosity-high glass transition temperature treated polyvinyl chloride resin according to claim 2, wherein said one or more high glass transition temperature agent forming monomers is a styrene type monomer, a vinyl nitrile, the various maleimides, indene, norbornene, the various unsaturated acid anhydrides, or combinations thereof.

4. A low inherent viscosity-high glass transition temperature treated polyvinyl chloride resin according to claim 3, wherein the amount of said polyvinyl chloride resin is from about 75 parts to about 500 parts by weight for every 100 parts by weight of said one or more monomers, wherein the amount of said chain transfer agent is from about 1.0 to about 15 milliequivalents for every 100 parts by weight of said one or more glass transition temperature agent forming monomers.

5. A low inherent viscosity-high glass transition temperature treated polyvinyl chloride resin according to claim 4, wherein said one or more chain transfer agents is $H_2S$, or said mercaptan alcohol having from 2 to 12 carbon atoms, wherein the amount of said polyvinyl chloride resin is from about 100 parts to about 350 parts by weight for every 100 parts by weight of said one or more glass transition temperature agent forming monomers, wherein the amount of said one or more chain transfer agent is from about 2 to about 10 milliequivalents for every 100 parts by weight of said glass transition temperature agent forming one or more monomers, and wherein said polyvinyl chloride resin has an inherent viscosity reduction to at least 5% below the initial inherent viscosity of said polyvinyl chloride resin.

6. A low inherent viscosity-high glass transition temperature treated polyvinyl chloride resin according to claim 5, wherein said one or more glass transition temperature agent forming monomers is alpha-methylstyrene, methylmethacrylate, acrylonitrile, or styrene.

7. A low inherent viscosity-high glass transition temperature treated polyvinyl chloride resin according to claim 1, wherein said treated polyvinyl chloride resin has an inherent viscosity reduction to at least 15% below the initial inherent viscosity of said polyvinyl chloride resin.

8. A low inherent viscosity-high glass transition temperature treated polyvinyl chloride resin according to claim 6, wherein said treated polyvinyl chloride resin has an inherent viscosity reduction to at least 15% below the initial inherent viscosity of said polyvinyl chloride resin.

* * * * *